United States Patent
Choi et al.

(10) Patent No.: US 6,857,654 B2
(45) Date of Patent: Feb. 22, 2005

(54) PASSENGER RESTRAINING APPARATUS FOR VEHICLE

(75) Inventors: Jae Seob Choi, Gyu (KR); Jang Hoon Lee, Gyu (KR); Nam Youl Kim, Gyu (KR)

(73) Assignee: Hyundai Mobis, Co., Seoul (KR)

( * ) Notice: Subject to any disclaimer, the term of this patent is extended or adjusted under 35 U.S.C. 154(b) by 0 days.

(21) Appl. No.: 10/203,712

(22) PCT Filed: Dec. 13, 2001

(86) PCT No.: PCT/KR01/02163

§ 371 (c)(1),
(2), (4) Date: Aug. 13, 2002

(87) PCT Pub. No.: WO02/47943

PCT Pub. Date: Jun. 20, 2002

(65) Prior Publication Data

US 2003/0011178 A1 Jan. 16, 2003

(30) Foreign Application Priority Data

Dec. 13, 2000 (KR) .......................................... 2000-75890
Dec. 13, 2000 (KR) .......................................... 2000-75891
Jun. 21, 2001 (KR) .......................................... 2001-35365
Jun. 21, 2001 (KR) .......................................... 2001-35366
Jun. 21, 2001 (KR) .......................................... 2001-35367
Jun. 21, 2001 (KR) .......................................... 2001-35369
Jun. 21, 2001 (KR) .......................................... 2001-35371
Dec. 10, 2001 (KR) .......................................... 2001-77787

(51) Int. Cl.[7] ............................................. B60R 21/20
(52) U.S. Cl. ............................ 280/728.2; 280/728.3; 280/732
(58) Field of Search .......................... 280/728.3, 732, 280/728.2, 730.1

(56) References Cited

U.S. PATENT DOCUMENTS

| 5,002,307 | A | | 3/1991 | Heidorn | |
| 5,707,100 | A | | 1/1998 | Suyama et al. | |
| 5,709,358 | A | | 1/1998 | Kubota | |
| 5,738,367 | A | * | 4/1998 | Zichichi et al. | 280/728.3 |
| 5,961,143 | A | | 10/1999 | Hlywka et al. | |
| 6,012,735 | A | | 1/2000 | Gray et al. | |
| 6,318,752 | B1 | * | 11/2001 | Warnecke et al. | 280/728.3 |
| 6,378,894 | B1 | * | 4/2002 | Trevino et al. | 280/728.3 |
| 6,467,800 | B1 | * | 10/2002 | Bey et al. | 280/728.3 |
| 6,568,705 | B2 | * | 5/2003 | Kinane | 280/728.3 |
| 6,601,870 | B2 | * | 8/2003 | Suzuki et al. | 280/728.3 |

FOREIGN PATENT DOCUMENTS

| EP | 970856 A2 | * | 1/2000 | ........... B60R/21/20 |
| JP | 07186781 | | 2/1995 | |

OTHER PUBLICATIONS

English Language Abstract for JP Appln. No. 07–186781.

* cited by examiner

Primary Examiner—Peter C. English
(74) Attorney, Agent, or Firm—Greenblum & Bernstein, P.L.C.

(57) ABSTRACT

The present invention relates to an apparatus for protecting a passenger of a vehicle, which is able to expand by at least one gas inflator activated in response to an impact in the case of a collision. The invention discloses an expandable passenger protecting apparatus, including a dashboard (10) having a breakable line (11a) invisible from the outside, an airbag door (11) defined by the breakable line (11a), an expandable passenger protecting module (50) arranged inside the dashboard to be aligned with the door (11), and a door holding unit (30) connected to both the airbag door and the dashboard for allowing the door to be rotated while maintaining one end of the door to the dashboard when the airbag is expanded and projected from the dashboard to a passenger. The present invention provides excellent operational efficiency of the airbag as well as the low manufacturing cost of the apparatus.

19 Claims, 15 Drawing Sheets

PASSENGER RESTRAINING APPARATUS FOR VEHICLE

TECHNICAL FIELD

The present invention relates generally to a passenger restraining apparatus for vehicles, and more particularly, to a passenger protecting apparatus for vehicles, which prevents a passenger from being injured by an airbag door when an airbag is expanded by a gas inflator actuated in the event of a collision and projected from a dashboard after breaking the airbag door with its expansion force, and which allows the airbag door, through which the airbag is projected from the dashboard, to be safely rotated.

BACKGROUND ART

Japanese Patent Laid-open Publication No. Hei. 07-186781 discloses a passenger protecting apparatus for vehicles provided with an airbag. According to this publication, the passenger protecting apparatus is operated to attenuate a shock applied to a passenger by expanding the side and front airbag modules installed at positions adjacent to both side and front of the passenger by a gas inflator activated when the vehicle is in a collision. In this case, the gas inflator is actuated to retard impact to be applied to the passenger in a direction of a vehicle's collision.

The conventional passenger protecting apparatus is designed such that one end of an airbag door formed on the dashboard is hinged to the dashboard by a plastic sheet or a metal plate. In this case, when the vehicle is in a collision, the airbag door is opened by the expansion force of the airbag, and simultaneously detached from the dashboard, and then may project toward the passenger. Or, the airbag door is incompletely opened at an acute angle due to the strength of the plastic sheet or the metal plate. Therefore, the conventional passenger protecting apparatus has a problem that a passenger who does not wear a safety belt may impact against and injured by the incompletely opened airbag door while leaning forward in the vehicle, in the event of a collision.

DISCLOSURE OF THE INVENTION

Accordingly, the present invention has been made keeping in mind the above problems occurring in the prior art, and an object of the present invention is to provide a passenger protecting apparatus for vehicles, which ensures a rapid and complete opening of an airbag door while an airbag is expanded, thus allowing the airbag door of the dashboard serving as a cover of the airbag to be rotated at a wide angle, and allowing a hinge part of the airbag door formed on the dashboard to have a desired strength and to be smoothly rotated.

In order to accomplish the above object, the present invention provides a passenger protecting apparatus for vehicles, comprising a dashboard having a concealed breakable line; an airbag door defined inside the breakable line of the dashboard; an expandable passenger protecting module installed inside the dashboard at a position aligned with the airbag door; and a door holding unit connected to both the airbag door and the dashboard to allow the airbag door to be open while connecting an end of the airbag door to the dashboard when an airbag of the expandable passenger protecting module is inflated and projected from the dashboard through the airbag door.

Protrusions may be formed on a fixing plate of the door holding unit to allow the fixing plate to be easily aligned with the guide frame as well as doubles the fixing force of a hinge joint of the door holding unit.

The reinforcing sheet may be provided with a breakable part at a position corresponding to the breakable line. The periphery of the breakable part may be mounted to the guide frame by a vibration welding process. Such a construction increases the structural strength of the periphery of the breakable line.

A rotating plate may be mounted to the inner surface of the dashboard by heating and melting exposed parts of a plurality of third protrusions formed on the inner surface of the dashboard and protruded from the rotating plate. Alternatively, the rotating plate may be mounted to the inner surface of the dashboard by tightening a plurality of nuts to bolts inserted in and protruded from the rotating plate.

The door holding unit may be manufactured in a single structure with a fixing part and a rotating part, and made out of a synthetic resin capable of allowing the door holding unit to fulfill its desired function. In such a case, a reinforcing sheet made of a cotton fabric or a hemp fabric may be mounted between the fixing and rotating parts of the door holding unit and the inner surface of the dashboard by a vibration welding process. A plurality of heat fusion ribs are preferably arranged on the surface of the rotating part at regular intervals.

Both ends of the reinforcing sheet of the door holding unit may be integrated with two fixing plates by an insert-injection molding process. In addition, a breakable line provided with dots in a horizontal direction is formed on the center portion of the reinforcing sheet. As such, an H-shaped airbag door may be employed in this invention.

Instead of the above-mentioned airbag door reinforcing sheet, two strip-shaped reinforcing sheets may be installed at two positions corresponding to both sides of the breakable line. In this case, each of the reinforcing sheets is mounted to both the rotating plate and the guide frame. A plurality of third protrusions may be formed on the central part of the rotating plate at regular intervals. The rotating plate may be mounted to the inner surface of the dashboard by heating and melting the exposed parts of a plurality of third protrusions formed on the inner surface of the dashboard and protruded from the rotating plate. Alternatively, a plurality of reinforcing sheets through which the third protrusions pass may be regularly mounted to the two strip-shaped reinforcing sheets.

Further, the reinforcing sheet may be preferably made of a polyester fabric which is treated by a PVC (polyvinyl chloride) coating process, so as to prevent the twist, the breakage, and the unexpected removal of the reinforcing sheet.

A close mounting between the surface of the guide frame and the periphery of the airbag door at the inner surface of the dashboard through the fixing plate of the reinforcing sheet is accomplished by the vibration welding process performed to weld the guide frame to the inner surface of the dashboard.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
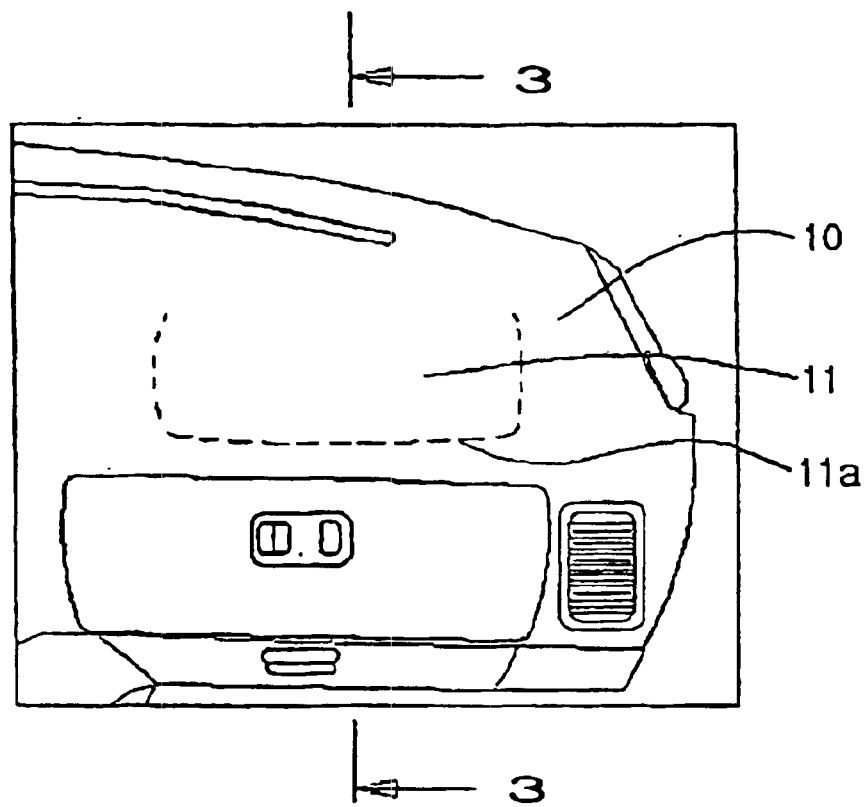
FIG. 1 is a view showing a dashboard of a passenger compartment, in which a passenger protecting module is installed.
Figure 2:
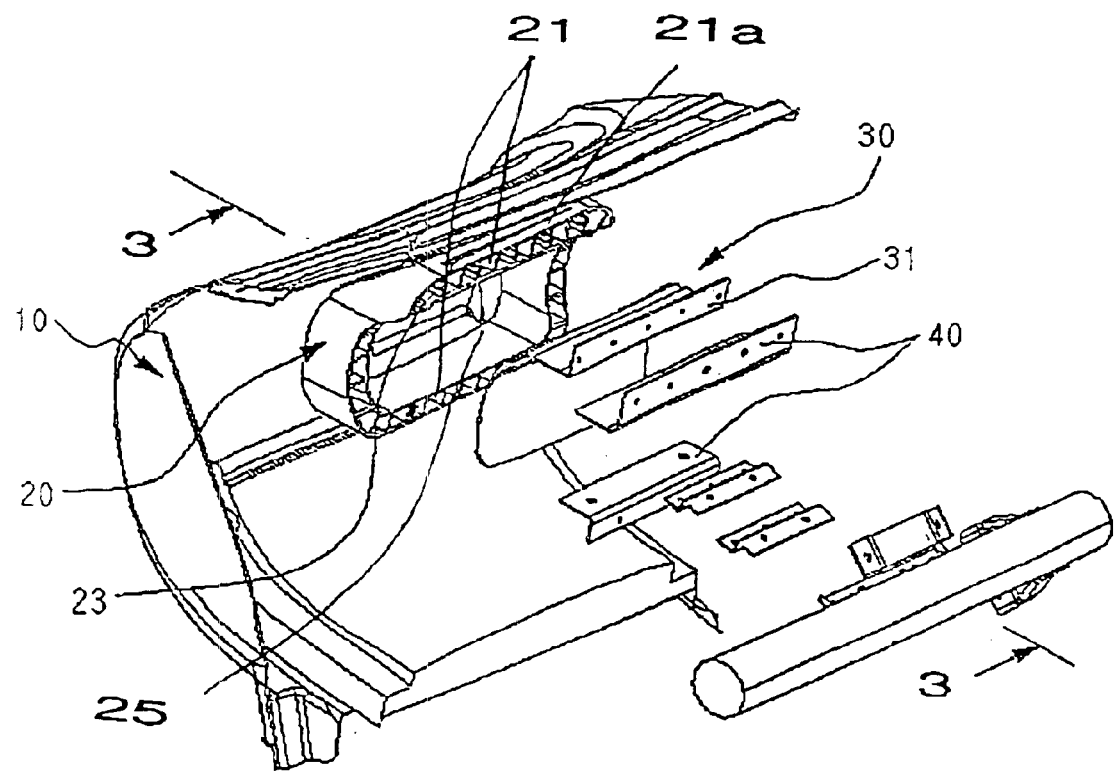
FIG. 2 is an exploded perspective view of a passenger protecting apparatus according to this invention, in which the passenger protecting apparatus is installed inside the dashboard.
Figure 3:
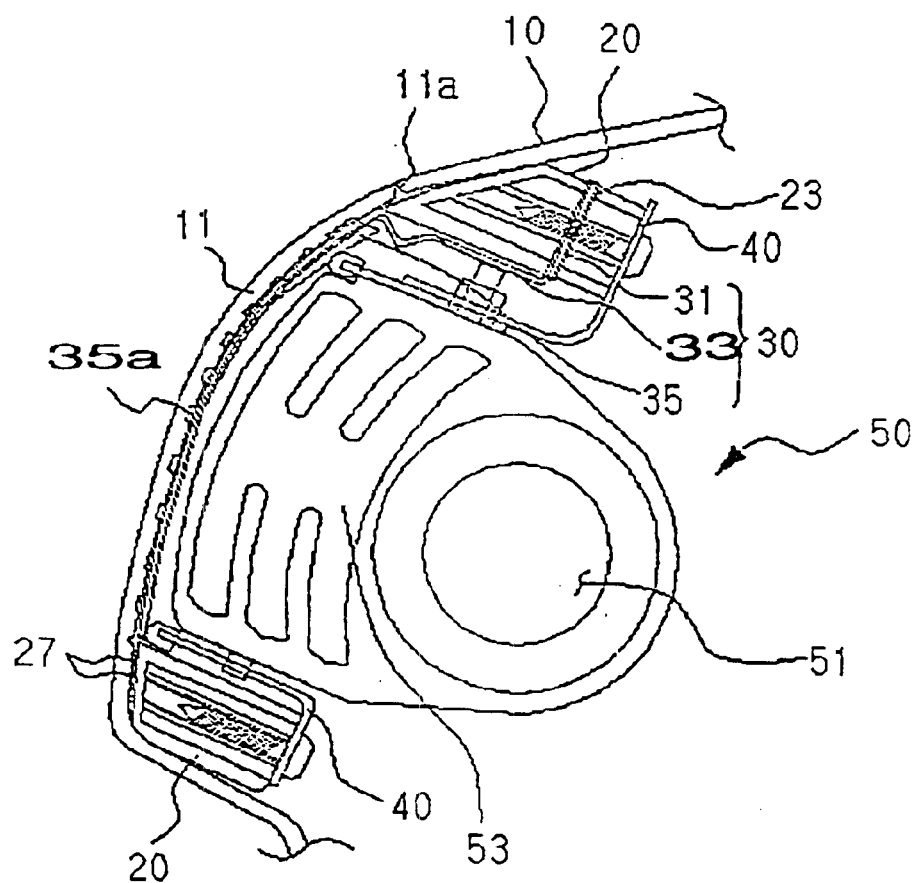
FIG. 3 is a sectional view taken along the line 3—3 of FIGS. 1 or 2, when the assembly of the passenger protecting apparatus is completed.
Figure 4:
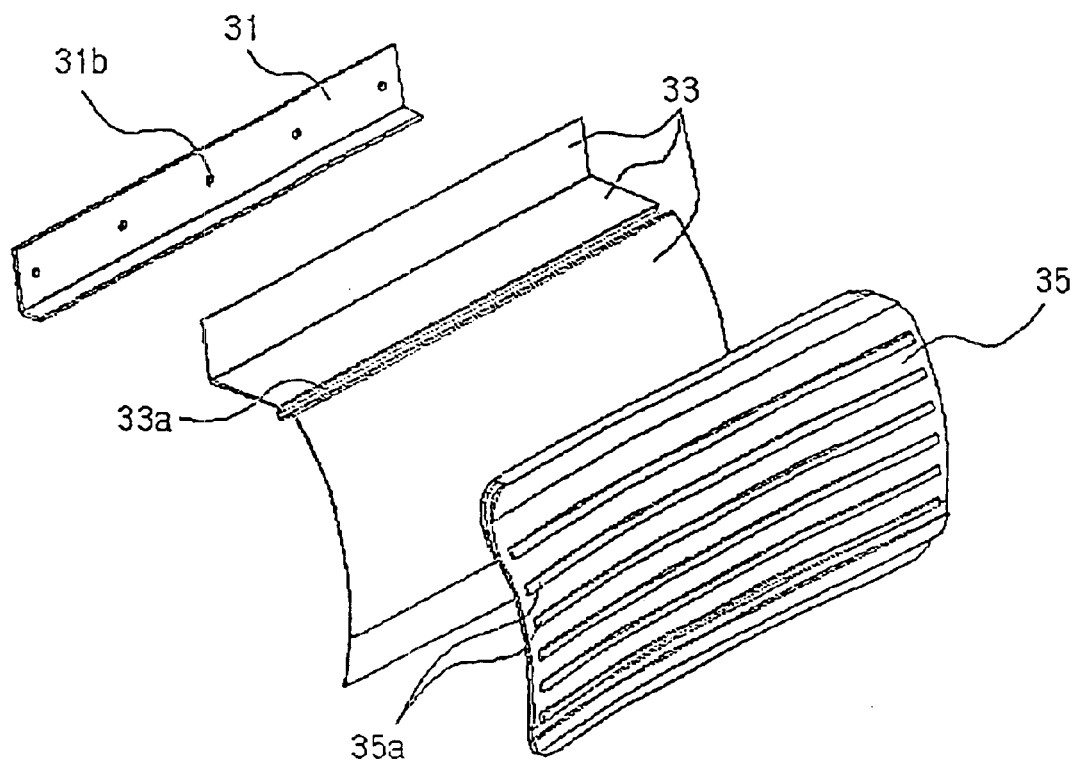
FIG. 4 is an enlarged perspective view showing the construction of a door holding unit mounted to a guide frame shown in FIG. 2.
Figure 5:
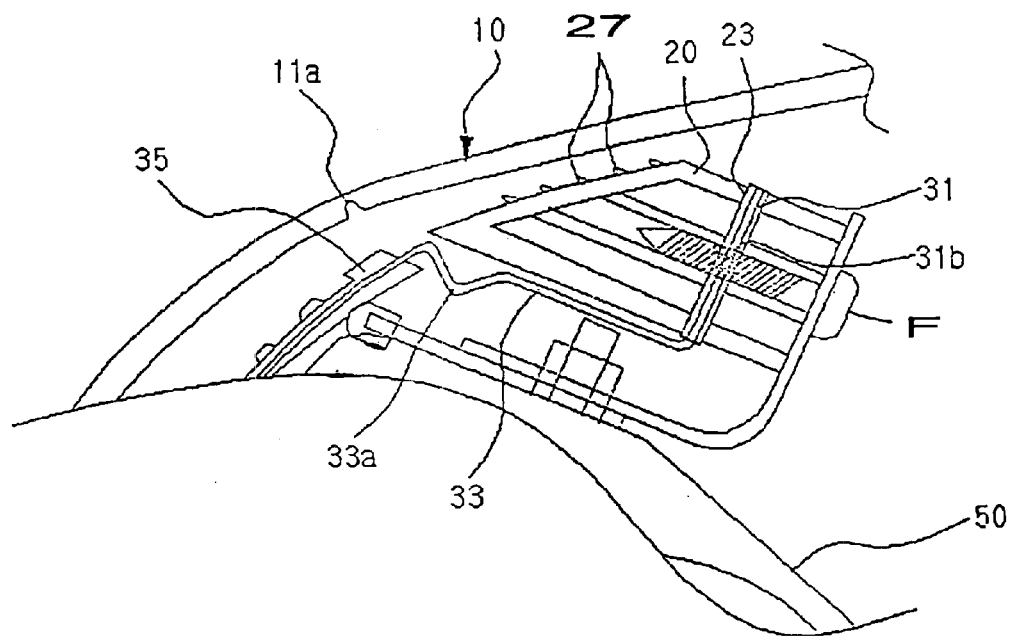
FIG. 5 is an enlarged sectional view showing the upper part of the passenger protecting apparatus of FIG. 3.
Figure 6:
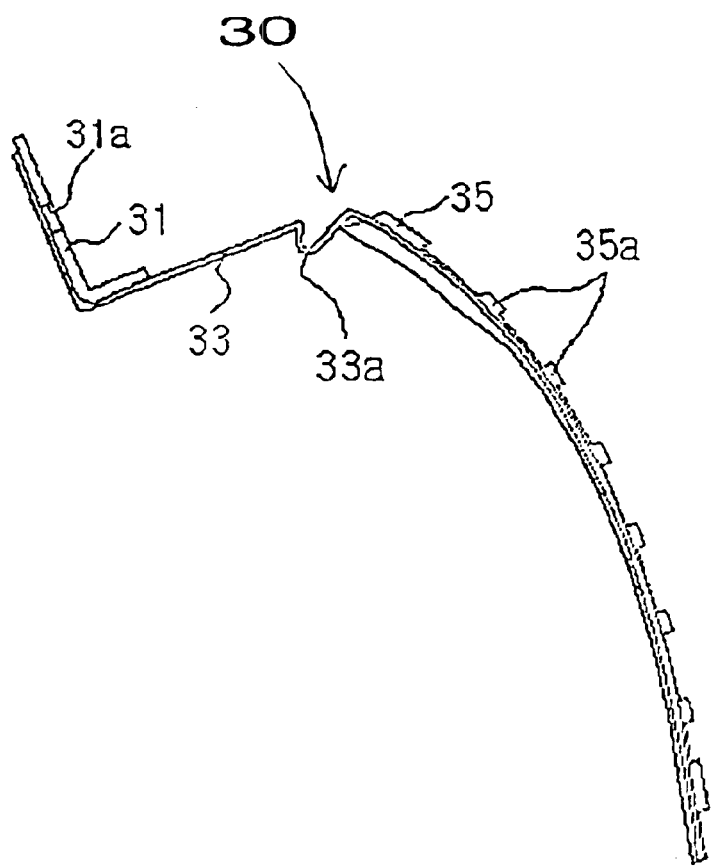
FIG. 6 is a detailed sectional view of the upper portion of the door holding unit of FIG. 5.
Figure 7:
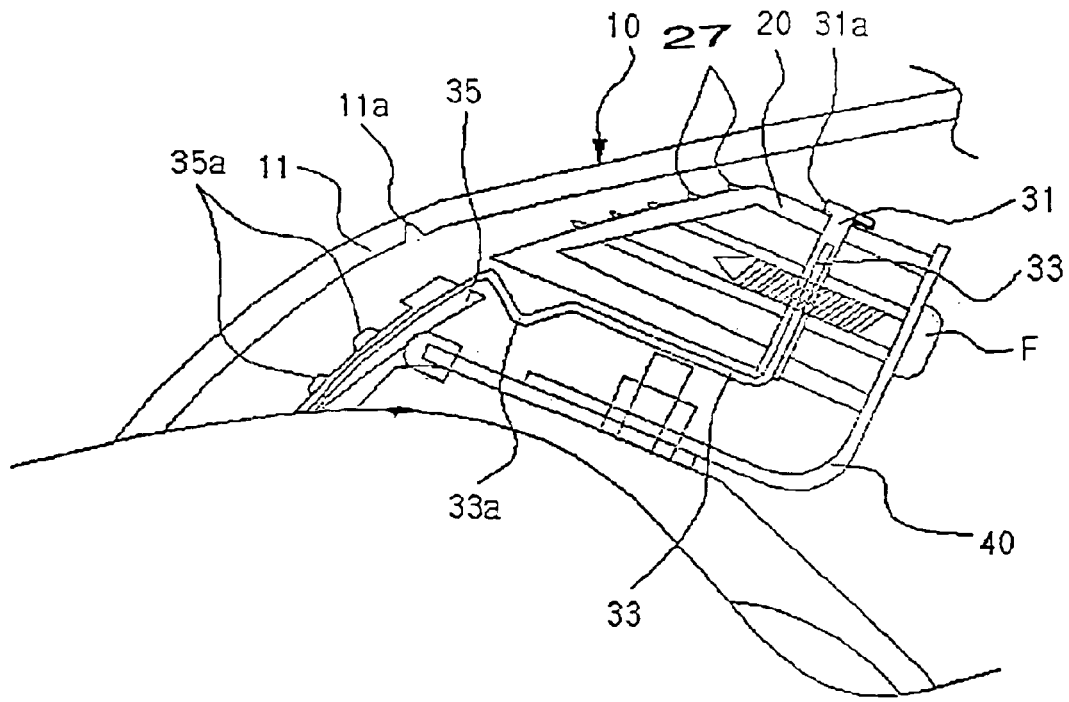
FIG. 7 is a view corresponding to FIG. 5, but showing a door holding unit according to the second embodiment of this invention.

Reference should now be made to the drawings, in which the same reference numerals are used throughout the different drawings to designate the same or similar components.

In the drawings, the reference numeral 10 denotes a dashboard, which is mounted beneath the windshield in a passenger compartment, and has various gauges and accessories for the use of a driver. The dashboard 10 covers the front part inside the passenger compartment and has a space for mounting the gauges and accessories therein.

A guide frame 20 is mounted to the inner surface of the dashboard 10 by a vibration welding process such that it surrounds the periphery of a breakable line 11a of the dashboard 10. Two boss parts 21 are formed at upper and lower portions of the guide frame 20, respectively. The central area of the guide frame 20 has an opening 25 with a size capable of surrounding an airbag door defined by the laser-scored breakable line 11a of the dashboard 10. Each of the two boss parts 21 has a plurality of locking holes 21a for receiving a fastening means F, such as bolts, setscrews, heat-fusion bars, snap-fits, and others.

Two brackets 40 are connected to the upper and lower portions, respectively, at a rear end of the guide frame 20 by the fastening means F. A passenger protecting module 50 is installed inside the guide frame 20 by the brackets 40, and has a space for receiving an airbag 53.

The airbag door 11 is defined by the breakable line 11a of the dashboard 10. The airbag door 11 is connected, by a vibration welding process, to a rotating plate 35 of a door holding unit 30 which is integrated with the dashboard 10 as will be described in detail later herein.

The passenger protecting module 50 is installed inside the dashboard 10 such that it is aligned with the airbag door 11 defined by the breakable line 11a of the dashboard 10.

The door holding unit 30 is connected to both the airbag door 11 and the dashboard 10 to allow the airbag door 11 to be open while maintaining its connection to the dashboard 10 when the airbag 53 of the expandable passenger protecting module 50 is expanded and projected from the dashboard through the airbag door.

The door holding unit 30 includes the guide frame 20 and a reinforcing sheet 33. The guide frame 20 surrounds, with its four sidewalls, the portion around the breakable line 11a which is formed through a laser scoring process. This guide frame 20 also has a slit 23 formed on one of the four sidewalls, and mounts the passenger protecting module 50 to the inner surface of the dashboard 10. The reinforcing sheet 33 is mounted to the rotating plate 35 by an insert-injection molding process. The reinforcing sheet 33 is integrated by an insert-injection molding process at its first end with a fixing plate 31 inserted through the slit 23 of the guide frame 20. The reinforcing sheet 33 is also integrated at its second end with the rotating plate 35 which is secured to the airbag door at the inner surface of the dashboard 10 through a vibration welding process, thus rotating around the first end along with the airbag door 11 opened by the expansion of the airbag 53.

In other words, the reinforcing sheet 33 is integrated with both the fixing plate 31 and the rotating plate 35 by an insert-injection molding process.

The guide frame 20 is provided on its surface with a plurality of first protrusions 27 for allowing the guide frame 20 to be welded to the periphery of the airbag door 11 at the inner surface of the dashboard 10 through a vibration welding process.

In this case, the reinforcing sheet 33 is made of a woven fabric, such as a cotton fabric, and a hemp fabric.

The fixing plate 31 has a plurality of screw holes 31b such that the fixing plate 31 is screwed together with the inserted reinforcing sheet 33 to the upper boss part 21 of the guide frame 20.

A plurality of second protrusions 35a are formed on the outer surface of the rotating plate 35 to allow the rotating plate 35 to be easily mounted to the airbag door 11 of the dashboard 10 through a vibration welding process.

It is preferable that the concealed breakable line 11a is formed by a laser scoring process. Alternatively, the breakable line may be formed using a knife or a hydraulic nozzle.

It is preferable that the reinforcing sheet 33 exposed outside the rotating plate 35 and the fixing plate 31 is provided with a kink part 33a.

Reference numeral 51 denotes a gas inflator which is installed in the passenger protecting module 50 and connected to the airbag 53 in such a way as to inflate the airbag 53 with air when necessary.

In the event of a collision, a conventional sensor (not shown) senses an impact and outputs a collision signal to an ECU (Electronic Control Unit: including a microprocessor), and then the gas inflator 51 is actuated by the ECU depending on whether the passenger wears a safety belt or not.

The operation of the expandable passenger protecting apparatus for vehicles according to this invention will be described in the following.

In this apparatus, the passenger protecting module 50, including the airbag 53 which is expanded in the event of a collision, is arranged inside the dashboard 10 under the windshield such that the activated airbag 53 is rapidly expanded in response to an impact.

When the sensor installed in the body of the vehicle detects impact (deceleration impact) produced by the collision of the vehicle and then outputs a collision signal to the ECU, the ECU determines whether the airbag 53 must be expanded or not in response to the level of the impact.

That is, in the case of a high speed collision (35 mph, the speed of about 64 kph), the forward speeds of both front and floor parts of the vehicle are almost simultaneously reduced. At this time, the ECU observes a deceleration wave form to determine whether the vehicle is collided at its front part or not. In the case of determining that the passenger airbag 53 must be expanded, an actuation signal is outputted from the ECU to the gas inflator 51.

When the gas inflator 51 is started in response to the actuating signal, the airbag 53 communicating with the gas inflator 51 is expanded.

When the expansion force of the inflated airbag 53 is applied to the airbag door 11 of the dashboard 10, the airbag door 11 is broken along the breakable line 11a, formed by the scoring process and defining the airbag door 11, under the expansion pressure of the airbag 53, and simultaneously the airbag door 11 of the dashboard 10 is opened.

In such a case, the airbag door 11 of the dashboard 10 is opened in such a way as that described in the following. First, the rotating plate 35 mounted to the airbag door 11, is primarily impacted by the expansion force of the airbag 53, and so the rotating plate 35 is forced forward through the dashboard 10. However, since one end of the rotating plate 35 having the reinforcing sheet 33 of the door holding unit 30 is hinged to the guide frame 20 by the fixing plate 31, and the guide frame 20 is mounted to the dashboard 10, the rotating plate 35 with the airbag door 11 is not completely removed from the dashboard 10, but is simply and smoothly rotated around the hinge joint to be opened.

In this case, the fixing plate 31 is fitted into the slit 23 formed on the guide frame 20, and is fixed to the guide frame 20 together with the bracket 40 by inserting the fastening means F into the screw holes 31b formed on the fixing plate 31.

The airbag door 11 of the dashboard 10 is defined by the breakable line formed through a laser scoring process such that the door 11 is broken along the breakable line when the door 11 is impacted by a force exceeding a predetermined reference force, thus allowing the inflated airbag 53 to be projected from the dashboard 10 to a preset position, where the airbag 53 protects a passenger if there is no obstacle in the projecting area of the airbag 53. The breakable line 11a of the airbag door is designed such that it is broken by an expansion force of the airbag when air pressure increases to expand the inner chamber of the airbag and applies an expansion force around the door 11. In such a case, the rotating plate 35 of the door holding unit is integrated with the door 11 and has a size enough to freely pass through an opening formed by the airbag door 11. Therefore, the rotating plate 35 uniformly transmits the breaking force, which is resulted from the expansion force of the airbag and applied to the rotating plate 35, to the airbag door, so the airbag is more rapidly expanded and projected to the outside of the dashboard with a small expansion force.

Figure 8:
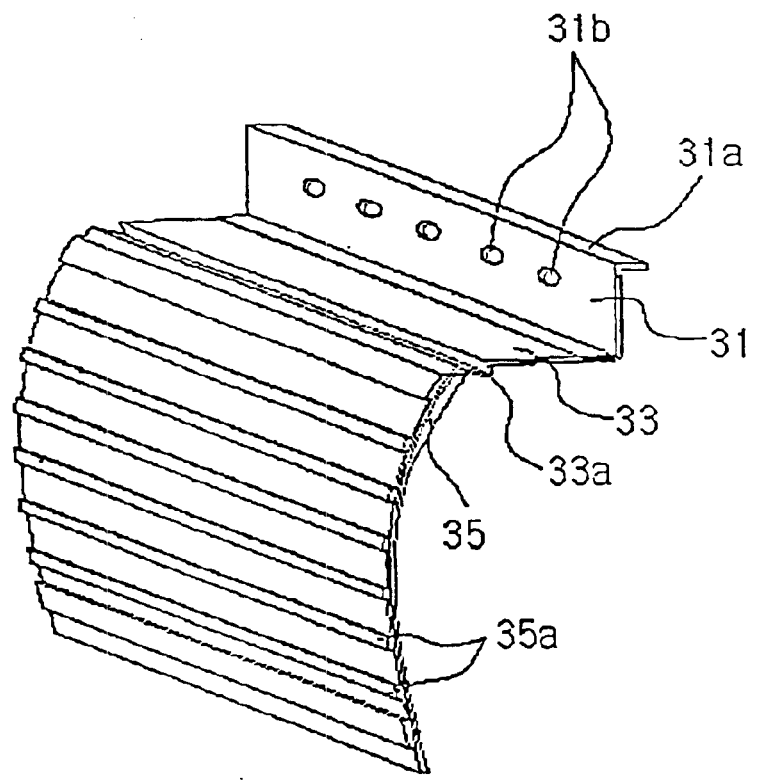
FIG. 8 is a perspective view schematically showing the door holding unit of FIG. 7.
Figure 9:
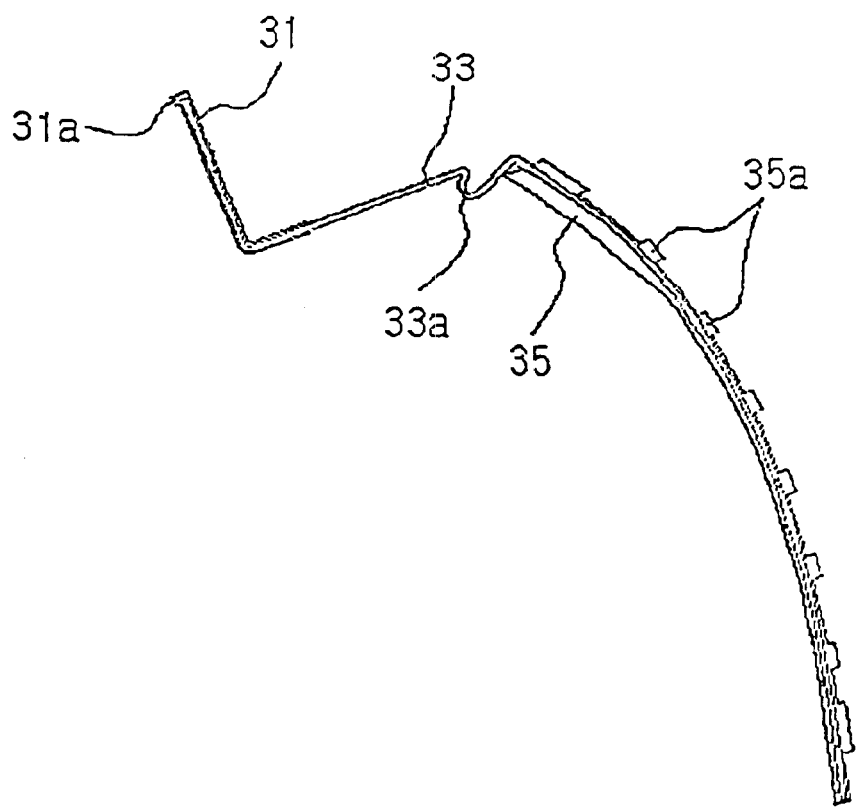
FIG. 9 is a detailed sectional view showing the construction of the upper portion of the door holding unit shown in FIG. 7.
Figure 10:
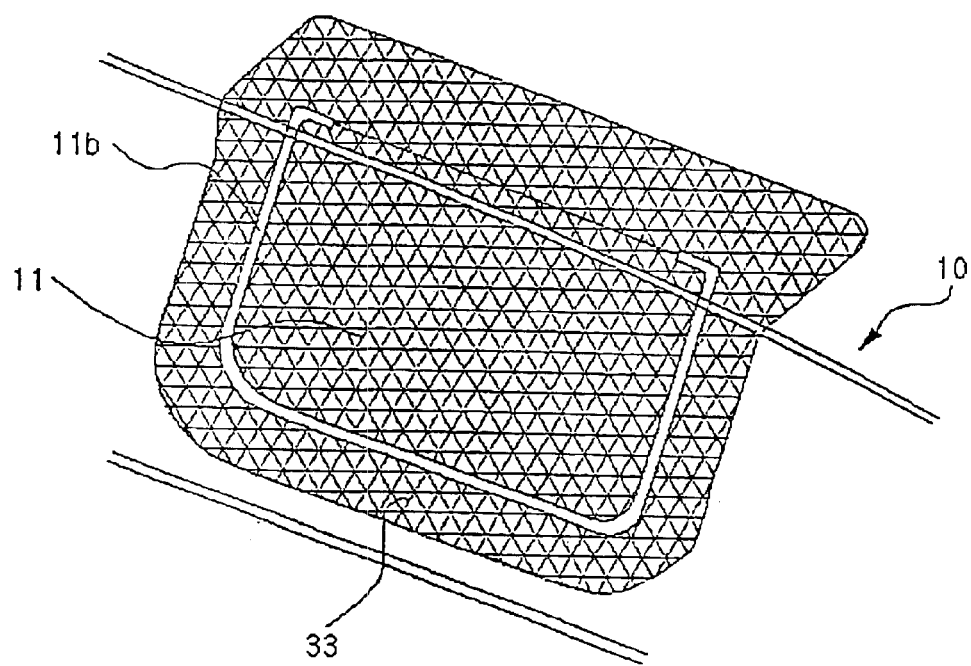
FIG. 10 is a view of a concealed door holding unit according to the third embodiment of this invention.

Meanwhile, in accordance with the second embodiment of this invention, as shown in FIGS. 8 to 10, the fixing plate 31 is provided with a flange 31a, thus allowing the fixing plate 31 to be easily aligned with the slit 23 of the guide frame 20 as well as doubling the fixing force of the hinge joint of the door holding unit 30.

In addition, as shown in FIG. 10, the reinforcing sheet 33 is provided with a breakable part 11b at a position corresponding to the breakable line 11a. The guide frame 20 may be mounted around the periphery of the breakable part 11b by a vibration welding process in the same manner as that of the primary embodiment. Such a construction increases the structural strength of the periphery of the breakable line 11a.

Figure 11:
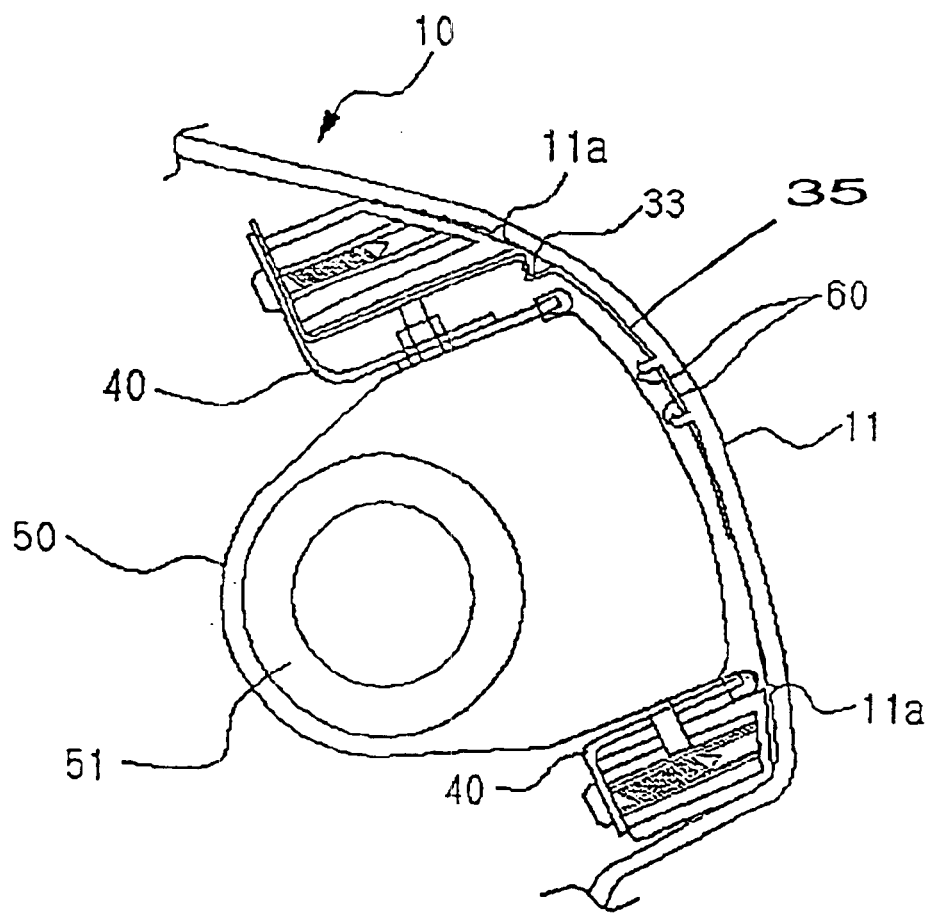
FIG. 11 is a view corresponding to FIG. 3, but showing a passenger protecting apparatus for vehicles according to the fourth embodiment of this invention.

Further, as shown in FIG. 11, the rotating plate 35 is mounted to the inner surface of the dashboard 10 by heating and melting exposed parts of a plurality of third protrusions 60, formed on the inner surface of the dashboard 10 and passing through the rotating plate 35. Furthermore, the rotating plate 35 may be mounted to the inner surface of the dashboard 10 by tightening a plurality of nuts to bolts inserted in and protruded from the rotating plate 35.

Figure 12:
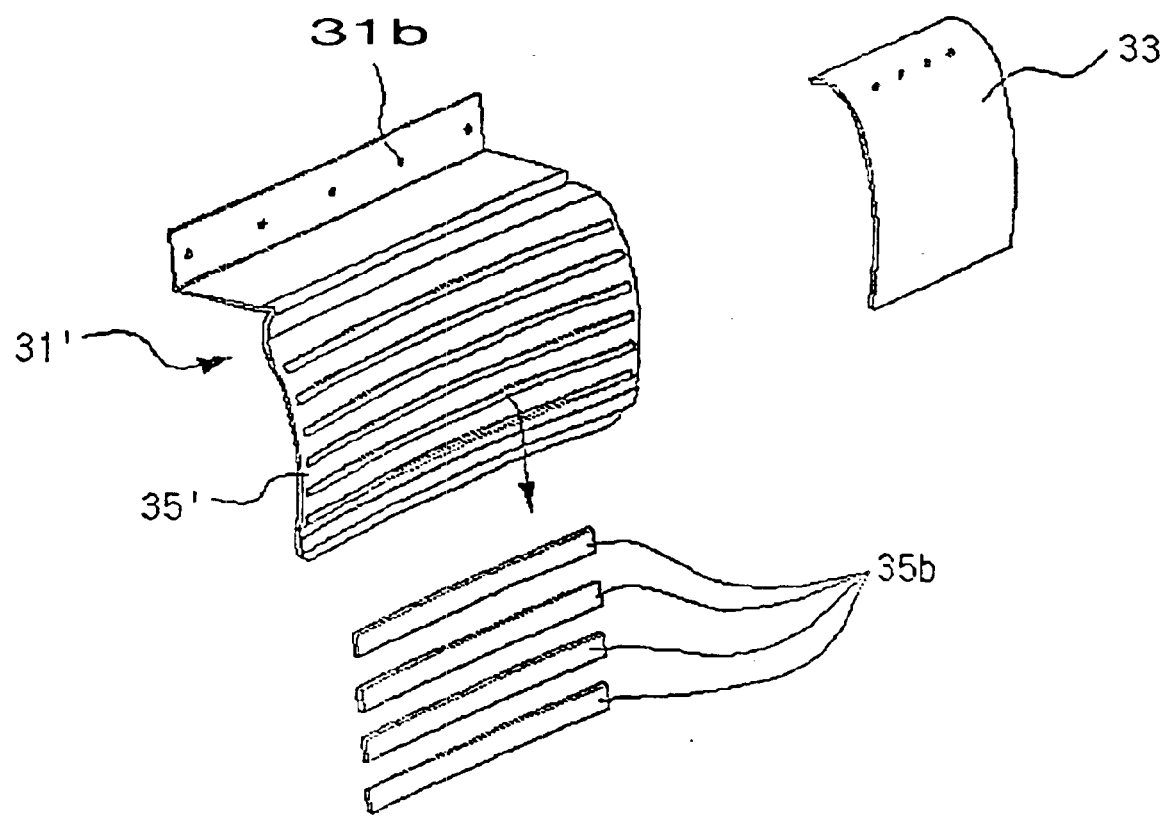
FIG. 12 is an exploded perspective view of a door holding unit according to the fifth embodiment of this invention.

Referring to FIG. 12, a door holding unit may be manufactured in a single structure with a fixing part 31' and a rotating part 35', and made of a synthetic resin, for fulfilling the function corresponding to that of the door holding unit 30 having the fixing plate 31 and the rotating plate 35. A reinforcing sheet 33 made of a cotton fabric or a hemp fabric is mounted between the fixing and rotating parts 31' and 35' and the inner surface of the dashboard 10 by a vibration welding process. A plurality of heat fusion ribs 35b are arranged on the surface of the rotating part 35' at regular intervals.

Figure 13:
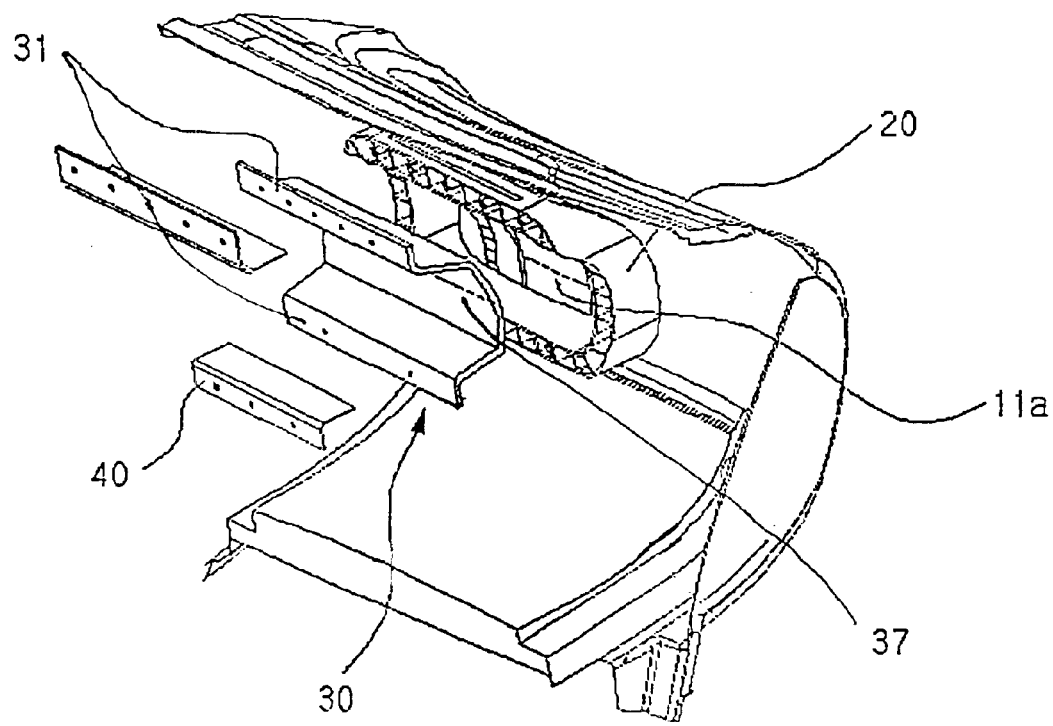
FIG. 13 is a view corresponding to FIG. 2, but showing a passenger protecting apparatus according to the sixth embodiment of this invention.

Further, as shown in FIG. 13, both ends of the reinforcing sheet 33 of the door holding unit may be integrated with two fixing plates 31 by an insert-injection molding process. In addition, a breakable line 37 provided with dots in a horizontal direction is formed on the center portion of the reinforcing sheet 33. As such, an H-shaped airbag door may be employed in this invention.

Figure 14:
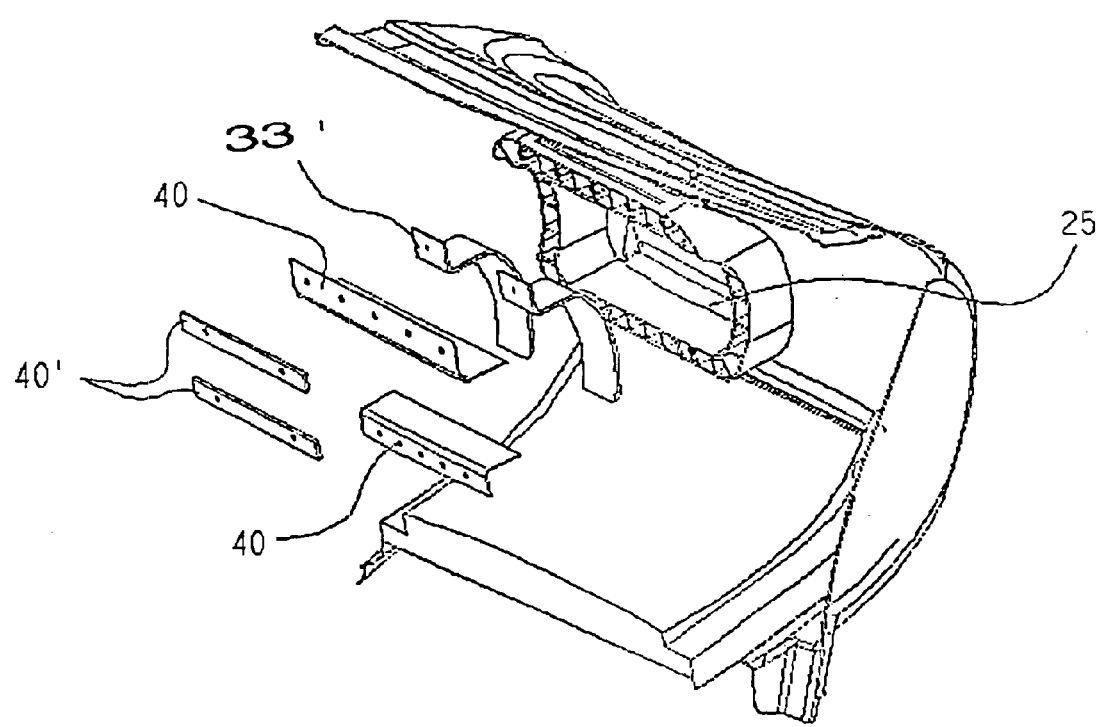
FIG. 14 is a view corresponding to FIG. 13, but showing a passenger protecting apparatus for vehicles according to the seventh embodiment of this invention.

As shown in FIG. 14, in place of the airbag door reinforcing sheet 33, two strip-shaped reinforcing sheets 33' may be installed at two positions corresponding to both sides of the breakable line 11a. In this case, each of the reinforcing sheets 33' is mounted to both the rotating plate 35 and the guide frame 20. As shown in FIG. 11, a plurality of third protrusions 60 may be formed on the inner surface of the dashboard 10 at regular intervals. The rotating plate 35 may be mounted to the inner surface of the dashboard 10 by heating and melting exposed parts of a plurality of third protrusions 60 formed on the inner surface of the dashboard 10 and passing through the rotating plate 35. Alternatively, a plurality of additional reinforcing sheets 40' through which the third protrusions 60 pass may be regularly mounted to the reinforcing sheets 33'.

Further, the reinforcing sheet 33 of this invention may be made of a polyester fabric which is treated by a PVC coating process, so as to prevent the twist, the breakage, and the unexpected removal of the reinforcing sheet 33.

Figure 15:
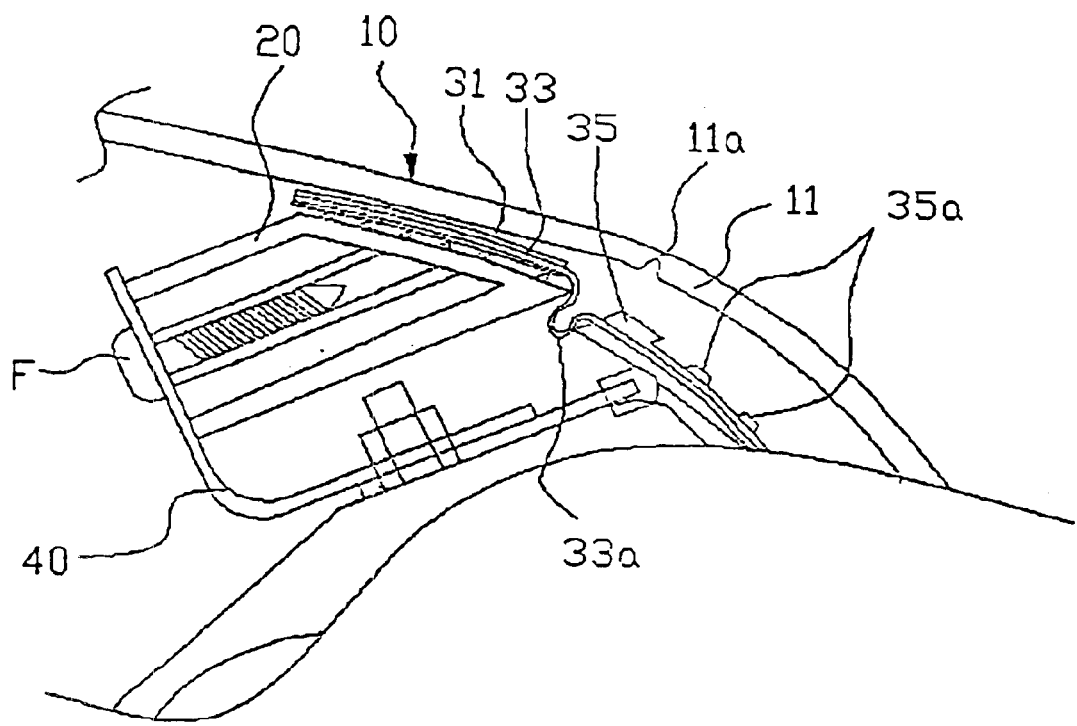
FIG. 15 is a view corresponding to FIG. 3, but showing a passenger protecting apparatus for vehicle according to the eighth embodiment of this invention.

As shown in FIG. 15, a close mounting between the surface of the guide frame 20 and the periphery of the airbag door 11 at the inner surface of the dashboard 10 through the fixing plate 31 of the reinforcing sheet 33 is accomplished by the vibration welding process for welding the guide frame 20 to the inner surface of the dashboard 10.

INDUSTRIAL APPLICABILITY

As described above, the present invention provides an expandable passenger protecting apparatus, which includes an airbag door and a door holding unit for holding the airbag door by a hinge joint and reinforcing the hinge joint, thus easily controlling the expanding pressure of an airbag when the airbag starts expanding, therefore allowing the airbag door to be rapidly, completely opened with a low energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A passenger protecting apparatus for vehicles, comprising:
    a dashboard having a concealed breakable line;
    an airbag door defined inside the breakable line of the dashboard;
    a passenger protecting module installed inside the dashboard at a position aligned with the airbag door;
    a door holding unit connected to both the airbag door and the dashboard to allow the airbag door to be opened while connecting an end of the airbag door to the dashboard when an airbag of the passenger protecting module is inflated with air and projected from the dashboard through the airbag door;
    wherein said door holding unit comprises:
    a rotating plate secured to an inner surface of the dashboard;
    a reinforcing sheet mounted to the rotating plate; and
    a fixing plate integrated with the reinforcing sheet and inserted through a slit of a guide frame.

2. The passenger protecting apparatus according to claim 1, wherein a close mounting between a surface of the guide frame and the inner surface of the dashboard around the periphery of the airbag door is accomplished by a vibration welding process for welding the guide frame to the inner surface of the dashboard.

3. The passenger protecting apparatus according to claim 1, wherein said fixing plate is provided on an end thereof with a flange to be stopped by the guide frame at a position around said slit.

4. The passenger protecting apparatus according to claim 1, wherein the reinforcing sheet is made of one of a synthetic resin, or a woven fabric.

5. The passenger protecting apparatus according to claim 1, wherein the fixing plate has a plurality of screw holes such that the fixing plate is screwed together with the reinforcing sheet to a boss part formed on the guide frame.

6. The passenger protecting apparatus according to claim 1, wherein the reinforcing sheet has a kink part.

7. The passenger protecting apparatus according to claim 1, wherein the rotating plate is mounted to the inner surface of the dashboard by mechanical fasteners.

8. The passenger protecting apparatus according to claim 1, wherein the reinforcing sheet has a breakable part at a position corresponding to the breakable line.

9. A passenger protecting apparatus for vehicles, comprising:
    a dashboard having a concealed breakable line;
    an airbag door defined inside the breakable line of the dashboard;
    a passenger protecting module installed inside the dashboard at a position aligned with the airbag door; and
    a door holding unit connected to both the airbag door and the dashboard to allow the airbag door to be opened while connecting an end of the airbag door to the dashboard when an airbag of the passenger protecting module is inflated with air and projected from the dashboard through the airbag door,
    wherein said door holding unit comprises:
    a guide frame having four sidewalls surrounding the airbag door and having a slit formed in one sidewall of the four sidewalls, and mounting said passenger protecting module to an inner surface of the dashboard; and
    a reinforcing sheet mounted to a rotating plate, said reinforcing sheet being integrated at a first end thereof with a fixing plate inserted through the slit of the guide frame, said reinforcing sheet also being integrated at a second end thereof with the rotating plate which is secured to the airbag door at the inner surface of the dashboard, thus rotating around the first end along with the airbag door opened by the expansion of the airbag.

10. The passenger protecting apparatus according to claim 9, wherein a plurality of guide frame protrusions are formed on a surface of the guide frame that allows the guide frame to be welded to the inner surface of the dashboard around a periphery of the airbag door.

11. The passenger protecting apparatus according to claim 10, wherein the rotating plate is provided on an outer surface thereof with a plurality of rotating plate protrusions for allowing the rotating plate to be readily welded to the airbag door of the dashboard by a vibration welding process.

12. The passenger protecting apparatus according to claim 10, wherein the rotating plate is mounted to the inner surface of the dashboard by heating and melting exposed parts of a plurality of dashboard protrusions formed on the inner surface of the dashboard and passing through the rotating plate.

13. The passenger protecting apparatus according to claim 12, wherein said dashboard protrusions pass through a plurality of additional reinforcing sheets, and are heated and melted to mount the additional reinforcing sheets.

14. The passenger protecting apparatus according to claim 10, wherein a close mounting between the surface of the guide frame and the inner surface of the dashboard around the periphery of the airbag door is accomplished by a vibration welding process for welding the guide frame to the inner surface of the dashboard.

15. The passenger protecting apparatus according to claim 9, wherein said fixing plate is provided on an end thereof with a flange to be stopped by the guide frame at a position around said slit.

16. The passenger protecting apparatus according to claim 9, wherein the reinforcing sheet is made of one of a synthetic resin or a woven fabric.

17. The passenger protecting apparatus according to claim 9, wherein the fixing plate has a plurality of screw holes such that the fixing plate is screwed together with the reinforcing sheet to a boss part formed on the guide frame.

18. The passenger protecting apparatus according to claim 9, wherein the reinforcing sheet has a kink part.

19. The passenger protecting apparatus according to claim 9, wherein the rotating plate is mounted to the inner surface of the dashboard by mechanical fasteners.

* * * * *